TIME COMPRESSION STORAGE CIRCUIT

Filed Dec. 29, 1960 3 Sheets-Sheet 1

INVENTORS:
JOSEPH P. HESLER,
WILLIAM PEIL,
BY Marvin L. Goldenberg
THEIR ATTORNEY.

INVENTORS:
JOSEPH P. HESLER,
WILLIAM PEIL,
BY Marvin A. Goldenberg
THEIR ATTORNEY.

INVENTORS:
JOSEPH P. HESLER,
WILLIAM PEIL,
BY [signature]
THEIR ATTORNEY.

3,144,638
TIME COMPRESSION STORAGE CIRCUIT

Joseph P. Hesler, Liverpool, and William Peil, North Syracuse, N.Y., assignors to General Electric Company, a corporation of New York Filed Dec. 29, 1960, Ser. No. 79,424
6 Claims. (Cl. 340—173)

The present invention relates to a time compression storage circuit of the type employing a delay line, wherein a varying electrical input signal is sampled at a fixed time internal and the information bits circulated at reduced time intervals in a closed path through the delay line so as to provide at the output a time compressed signal corresponding to the original input signal. Such a time compression storage circuit has particular application to deltic correlator circuits, as for example employed in sonar and radar equipment.

A deltic correlator circuit is defined as one in which time compressed signals in digital form are correlated, with the answer to the correlation being supplied in real time. The advantage of this mode of correlation is that an accurate correlation of a large number of information bits may be obtained in short time.

In time compression storage circuits of the type under consideration, the information bits are normally in ditigal form, being pulses, each occurring in a given time interval. Each information sample circulates one time through and re-enters the delay line before the succeeding sample is taken and admitted to the delay line, so that successive information bits are circulated and stored in the circuit in successive time intervals. In such storage circuits it is a requirement that the input signal be sampled at a frequency equal to the inverse of the delay time of the path through which the information bits are circulated, which is essentially the delay line period, plus or minus an additional short delay. The latter is normally the time interval between information bits which is selected to be a small fraction of the total delay. It is also necessary that the sampling frequency be fixed so that the information bits are spaced by equal intervals to provide an accurate recapitulation of the original signal. It may also be appreciated that a fixed sampling frequency is essential in correlation operations where, e.g., a stored transmitted pulse is correlated with the target return signals for readily detecting low energy return signals, so that identical samples of the signals to be correlated are operated upon.

To provide the sampling frequency, it is conventional in the prior art to circulate a synchronizing pulse through an additional closed path having an auxiliary delay line equal to the primary delay line in the information bit path. In order to insure a fixed sampling frequency against temperature changes, the auxiliary delay line must be maintained closely matched to said primary delay line. In most practical circuits, these delay lines are constructed of quartz or silica which have a temperature coefficient of delay that is in the order of −80 p.p.m./° C. This coefficient, coupled with the relatively long delay times required in most applications, place stringent requirements on the temperature regulation of the circuit environment when attempting to provide a match between the delay lines. In addition, since precise delay matching is not always feasible, certain allowances in the bit intervals must be employed which reduce the storage capacity of the circuit.

Accordingly, it is one object of the present invention to provide a time compression storage circuit having reduced circuit complexity and improved circuit operation.

A further object of the present invention is to provide a time compression storage circuit in which the requirement of providing an additional matched delay line for the synchronizing pulse can be eliminated.

A still further object of the present invention is to provide a time compression circuit which employs a single delay line to provide the delay both for the information bits and for the synchronizing pulse.

These and other objects of the invention are accomplished in one embodiment of a time compression storage circuit in which a variable input signal is introduced and sampled at a predetermined sampling frequency. The circuit comprises a first path closed by a long delay line through which the information bits are circulated. Said first path includes essentially a short delay means and a plurality of gating means for sampling new information and passing recirculated prior information bits. A second path is provided, also closed by said long delay line, through which is circulated a synchronizing pulse employed to actuate said gating means at said predetermined sampling frequency. Said second path includes essentially a synchronizing regenerator means, having an inherent short delay, and a threshold detector. The total delay of the second closed path is equal to the sampling period, which is a small fraction, typically each $1/2500$, of the input signa that may be stored in the delay line. The total delay of the first closed path is offset from the second closed path delay by one information bit interval. The difference in time between the period of successive synchronizing pulses circulating in the second closed path and the period of the recirculated information bits circulating in the first closed path permits the information bits in the delay line to shift relative to the synchronizing pulse as new information bits are being stored. Thus, each information bit traverses the first closed path and re-enters the silica delay line before the succeeding information bit is taken and admitted to the delay line, with the synchronizing pulse following the most recent information bit. Successive information bits are thereby recirculated through the delay line in adjacent time intervals to provide a time compressed signal whose duration is a small fraction of the original input signal.

As a further aspect of the invention, the amplitude of the synchronizing pulses generated is a few magnitudes greater than the amplitude of the information bits, so that the threshold detector in the second closed path will pass the synchronizing pulses and reject the information bits. The synchronizing pulses circulate only through the second closed path and are prevented from circulating through the first closed path by an inhibiting circuit which forms a part of the recited gating means.

While the specification concludes with claims particularly pointing out and distinctly claiming the subject matter which is regarded as the invention, it is believed that the invention will be better understood as the following description is taken in connection with the accompanying drawings in which:

Figure 1:
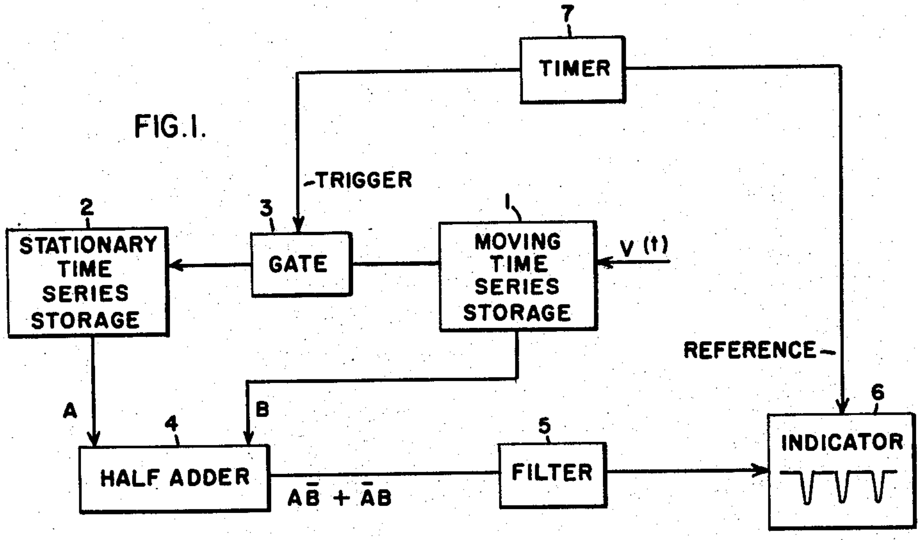
FIGURE 1 is a block diagram of a deltic correlator employing the time compression circuit of the present invention.

In FIGURE 1 there is illustrated in block diagram form a deltic correlator circuit such as might be employed in a sonar system for indicating low energy target return signals. Each transmitted pulse and the target return signals resulting therefrom are transformed into time compressed signals. The time compressed transmitted pulse is correlated with the time compressed return signals so that low energy return signals can be detected from high background noise to provide ready target identification. Utilizing such correlation techniques a signal to noise ratio of the received signals of less than 1:20 is tolerable.

Figure 2:
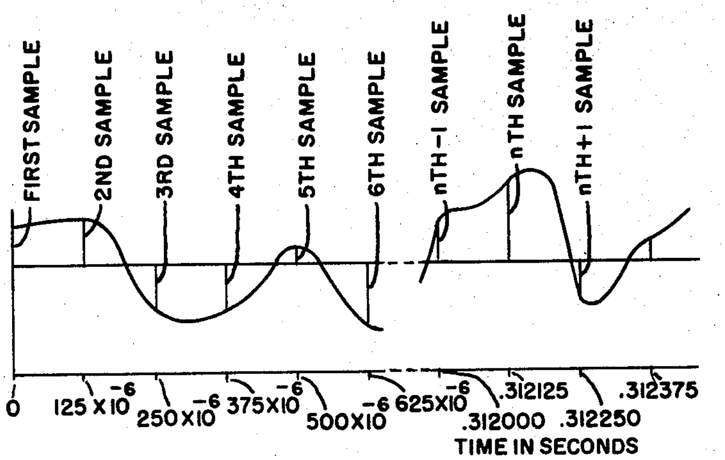
FIGURE 2 is a graph showing the wave form of the input signal applied to the circuits of FIGURES 1 and 3.
Figure 3:
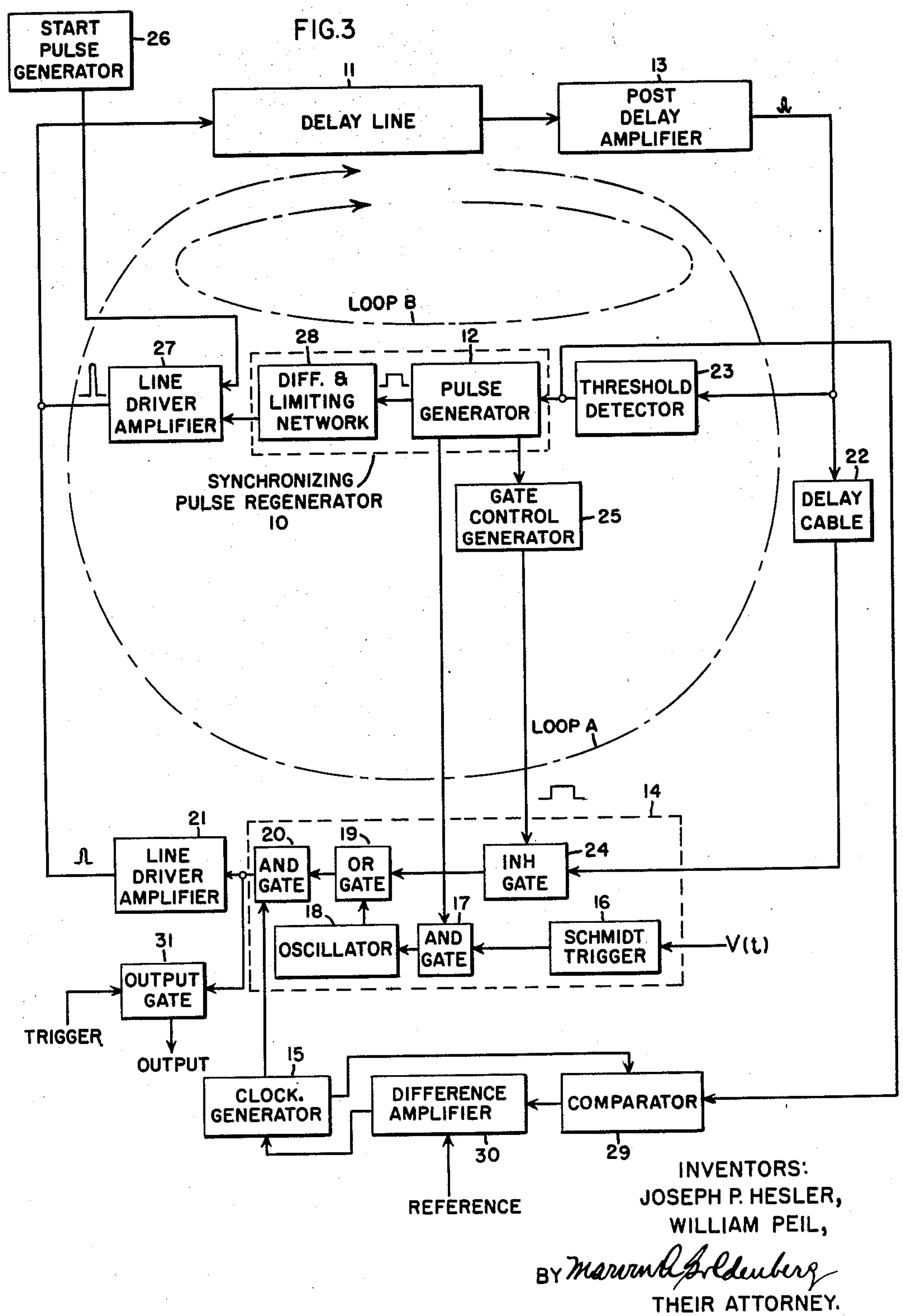
FIGURE 3 is a block diagram showing in detail the time compression storage circuit of the present invention.

The correlator circuit includes a Moving Time Series (MTS) time compression storage circuit 1, to which the present invention primarily relates and whose component parts are shown in block form in FIGURE 3. To the MTS circuit 1 is applied an input signal V($t$) whose wave form may be illustrated by the graph of FIGURE 2. Initially V($t$) is a transmitted pulse coupled from the transmitter of the sonar equipment. This pulse is sampled at a fixed rate and the sample information bits are recirculated and stored in a delay memory contained in MTS circuit 1 as a time compressed signal in digital form. A synchronizing pulse is also circulated through said delay line and is employed to provide the sampling frequency. The recirculated information bits experience a delay differing from the delay applied to the synchronizing pulse by one bit interval, so that the recirculating information bits advance one bit interval relative to the synchronizing pulse during each sampling period.

When the delay line is completely filled, normally at the termination of the transmitted pulse, the time compressed stored information bits are transferred during a single sampling period into a Stationary Time Series (STS) time compression storage circuit 2, the construction of which may be similar, although less complex, to the MTS circuit 1. The transfer is accomplished by a trigger voltage which actuates a gate circuit 3 coupling a first output of the MTS circuit to the input of the STS circuit. The transferred information bits are continuously recirculated in a second delay line memory in the STS circuit, the delay applied to the recirculating information bits in the STS circuit being equal to the delay of the synchronizing loop in the MTS circuit 1. During the time the compressed transmitted pulse is circulated in the STS circuit 2, target return signals of the transmitted pulse are applied as the input signal V($t$) to the MTS circuit 1, and are stored therein as a time compressed signal. After the delay line memory in MTS circuit 1 is filled, each new information bit added causes the oldest information bit to be erased.

The time compressed transmitted pulse in the STS circuit 2 is correlated with the time compressed target return signal in MTS circuit 1 in a conventional half adder component 4, to which a first input A is applied from STS circuit 2 and a second input B is applied from a second output of the MTS circuit 1. The half adder 4, during every sampling period, compares each information bit in the STS circuit with each information bit present in the MTS circuit, and is of the type which provides an output pulse only when the two compared bits are different. When the compared bits are alike, no output pulse appears. The output, which may be written in logical form as $A\overline{B}+\overline{A}B$, is connected to a filter circuit 5. Filter circuit 5 provides an indication of existing correlation between the signals applied to inputs A and B by passing a first level of energy for the uncorrelated conditions, and passing a lower energy level, theoretically zero, at points of correlation.

The filter 5 may be connected to an indication means 6, such as an oscilloscope or an electronic writing pen, to provide a visual indication of the various targets. A timer circuit 7 may be employed to apply the trigger signal to gate 3 at the proper time, and to provide a time reference sweep voltage to the indication means 6.

Referring now to FIGURE 3, there is illustrated a block diagram of applicants' time compression storage circuit of the MTS type shown in FIGURE 1, in which a variable input signal V($t$) is introduced and sampled at a predetermined sampling frequency. The information samples obtained are transformed into digital symbols or bits in the form of a pulse or absence of a pulse (where a pulse represents a positive portion of the input signal and the absence of a pulse represents a negative portion of the input signal). The information bits are circulated through and stored in a long band-pass delay line 11 having a delay time approximately equal to the inverse of the sampling frequency, so as to provide a time compressed signal whose duration is a small fraction of the original input signal. A synchronizing pulse from a synchronizing pulse regenerator 10 is also circulated through the delay line 11 and provides the sampling frequency.

In the time compression storage circuit under consideration, the delay line 11 provides a delay of 125 microseconds and is operated at a 20 megacycle bit rate. This yields a capacity of 2,500 bit intervals with a bit interval of 50 millimicroseconds. Transistor components have been employed in the storage circuit in one operative embodiment, but other components such as vacuum tubes and tunnel diodes may also be used.

The storage circuit may be considered to comprise three portions: (1) a first path closed by the delay line 11, forming information loop A, to time compress and store the information samples, (2) a logic network 14 employing a plurality of gating circuits a portion of which are actually a part of said first path, for timing and steering the recirculating information and the new samples, and (3) a second path also closed by the delay line 11, forming synchronizing loop B, for providing to the logic network 14 the proper sampling frequency. In addition, there is an automatic frequency control circuit for phase locking the synchronizing pulse to a clock signal from clock signal generator 15, which maintains a constant phase relationship between the information bits.

Considering first the information loop A together with logic network 14, a variable input signal V($t$), the wave form of which may be illustrated by the graph of FIGURE 2, is connected to a conventional Schmidt trigger circuit 16 in logic network 14. Trigger 16 transforms the analog input signal V($t$) into a digital signal of two prescribed logic levels, one level corresponding to a positive portion of V($t$) and a second level corresponding to a negative portion of V($t$). The output from trigger circuit 16 is connected as a first input to AND gate 17, which may be a conventional resistor diode logic gate circuit. An output from the pulse generator 12 of the synchronizing loop B is connected as a second input to AND gate 17. With these two inputs present, a pulse from generator 12 is allowed to pass through AND gate 17 when V($t$) is positive.

The output of AND gate 17 is connected to the input of blocking oscillator 18. Blocking oscillator 18 is typically of the type having a differentiating network at the input for insuring operation at the leading edge of the pulse applied thereto and for providing an output pulse width independent of the trigger pulse. The output of blocking oscillator 18 is connected as a first input to OR gate 19, which may be a conventional resistor diode logic gate. A second input is connected to OR gate 19 from INHIBIT circuit 24, which may be considered to be a time responsive gate. The output of OR gate 19 is connected as a first input to AND gate 20, which is similar to AND gate 17. A clock signal from clock signal generator 15, a sine wave generator, is connected as a second input to AND gate 20. The frequency of the clock signal is equal to the bit rate of the time compressed signal circulating in the information loop, or in this instance 20 megacycles, as will be presently appreciated. With the two inputs to AND gate 20 present, a single positive half-cycle of the clock signal is allowed to pass, appearing at the output thereof as a single information bit pulse. The output of AND gate 20 is connected to the input of line driver amplifier 21. Amplifier 21 is a conventional component, typically connected in emitter follower fashion when considering transistor components. The output of amplifier 21 is connected to the input of the long delay line 11 for supplying information bit pulses of constant amplitude.

In the embodiment being described, the delay line 11 is typically a fused silica delay line characterized by a band-pass frequency response, wherein for the maximum pass band obtainable, the upper pass band frequency, $F_2$, is approximately twice the lower pass band frequency, $F_1$. In the delay line under consideration, $F_1$ is approximately 20 megacycles and $F_2$ is approximately 40 megacycles.

The output of delay line 11 is connected to the input of a post delay amplifier 13, which amplifies the attenuated pulses received from delay line 11 so that the overall gain in the information loop, and also the synchronizing loop, is sufficient to maintain continuous regeneration of the circulating pulses. The output of amplifier 13 is connected to a delay cable 22, which is a short delay means providing, in this embodiment, a delay of two information bit intervals, equal to 100 millmicroseconds. (It may be seen that a second output is also taken from amplifier 13, which is connected to threshold detector 23 of the synchronizing loop B.) The output of delay cable 22 is connected as a first input to INHIBIT circuit 24 of logic network 14. A second input is connected to INHIBIT circuit 24 from a gate control generator 25, contained in the synchronizing loop, for applying an inhibiting pulse. Gate control generator 25 comprises a blocking oscillator providing a pulse having a width of four bit intervals, or 200 millimicroseconds, which acts to prevent the pulses received from delay cable 22 from traversing the INHIBIT circuit 24 during the time the inhibiting pulse is applied. Thus the delay cable 22 and the INHIBIT 24 prevent the synchronizing pulse from circulating through the information loop A. They also assist in maintaining a separation between the sychronizing pulse and the information pulses, as will be more clearly described presently. The output of INHIBIT circuit 24 is connected to OR gate 19 as the second input. The output of the time compression storage circuit shown in FIGURE 1 is normally taken at the output of AND gate 20 through output gate 31.

Standardization of the information bit pulses by the clock signal maintains the bit pulses of constant amplitude and shape as they are recirculated. It also insures the positioning of each pulse at the center of the bit interval.

Considering now the synchronizing loop B, a start pulse from start pulse generator 26 is connected as a first input to line driver amplifier 27, which may be an emitter follower amplifier similar to amplifier 21. Line driver amplifier 27 provides a synchronizing pulse at the output thereof having an amplitude a few magnitudes greater than the information pulses at the output of line driver amplifier 21, typically four or five times. The width of the synchronizing pulse is slightly more than one-half the information bit interval, as compared to the half-interval width of the information bits. The output of line amplifier 27 is connected in common with the output of line driver 21 to the input of delay line 11. The previously referred to threshold detector 23 is connected to the output of amplifier 13 and is adjusted to pass only the synchronizing pulse and to reject the lower amplitude information bits. The gain of amplifier 13 is sufficient to cause the synchronizing pulses to exceed the threshold level.

A first output from threshold detector 23 is connected to the input of pulse generator 12, preferably in the form of a blocking oscillator, of the synchronizing pulse regenerator 10. Generator 12 generates a pulse having a width of three information bit intervals. A first output from pulse generator 12 is connected to the input of gate control generator 25 for triggering the inhibiting pulse generated therein. (A second output from generator 12 is connected to AND gate 17, as previously recited.) A third output from generator 12 is connected to the input of a differentiating and limiter network 28 of synchronizing pulse regenerator 10, which differentiates and passes only the trailing edge of the pulse from generator 12 to provide a succeeding synchronizing pulse delayed by three bit intervals. This is one more bit interval than the delay of delay cable 22, thereby permitting the information bits to slide by the synchronizing pulse in the delay line so that the synchronizing pulse always assumes a position two intervals behind the most recent information bit. The output from differentiating and limiter network 28 is connected as a second input to line driver amplifier 27. The standardization of the synchronizing pulses by the synchronizing pulse regenerator 10 maintains a constant amplitude synchronizing pulse as the pulse is recirculated.

Referring to the frequency control circuitry, a second output from threshold detector 23 is connected as a first input to a conventional comparator circuit 29, a second input to comparator 29 being connected from clock signal generator 15. Comparator 29 provides at the output an error signal which represents a measure of an out-phase condition between the synchronizing pulse and the clock signal. For proper phasing and zero error signal, the synchronizing pulse may be centered on the 180° crossing of the clock signal. The output from comparator 29 is connected as a first input to a conventional difference amplifier 30. A reference voltage is connected as a second input to difference amplifier 30, the difference of the two inputs providing a control signal at the output which is connected to the clock signal generator 15 to control the frequency thereof. Thus, should the synchronizing pulse be improperly phased with respect to the clock signal, normally resulting from a variation in the delay of the temperature sensitive delay line 11, the clock signal frequency is accordingly adjusted to provide a proper phasing.

Considering the operation of the circuit of FIGURE 3, samples are taken of the input signal $V(t)$ at a fixed sampling period, as shown by the vertical solid lines in the graph of FIGURE 2. Upon being recirculated through the information loop, the information bits form a time compressed signal, as shown by a series of graphs in FIGURE 4. The following relation must hold to perform to operation indicated in the graphs of FIGURE 4.

$$T_s = T_1 \pm \tau_b \quad (1)$$

where, $T_s$=total delay in the synchronizing loop.

$T_i$=total delay in the information loop.

$\tau_b$=single bit interval=fifty millimicroseconds for a 20 megacycle bit frequency.

The choice of sign in Equation 1 determines the order in which the information bits of the time compressed signal will be read out of the storage circuit. In the present embodiment, the relation being considered is, $$T_s = T_i + \tau_b \quad (2)$$

This choice allows the information bits to be read out in their normal sequence and permits the information bits to slide by the synchronizing pulses in the delay line 1 and avoid intersymbol interference between the regenerated synchronizing pulse and the newest information bit. By sliding it is meant that during each sampling period the recirculated bits advance one bit interval with respect to the synchronizing pulse.

With a delay provided by delay cable 22 of two bit intervals, or 100 millimicroseconds, and a delay in the synchronizing pulse regenerator 10 equal to three bit periods, or 150 millimicroseconds, the following equations may be written:

$$T_s = \tau_e + 3\tau_b = 125 \text{ microseconds} + 150 \text{ millimicroseconds} \quad (3)$$

$$T_i = \tau_e + 2\tau_b = 125 \text{ microseconds} + 100 \text{ millimicroseconds} \quad (4)$$

where $\tau_e$ is equal to the delay of the silica delay line 1. It may be seen that the requirement of Equation 2 is fulfilled.

The synchronizing loop generates a synchronizing pulse to provide a sampling frequency of $$\frac{1}{T_s}=\frac{1}{125.150\times 10^{-6}} \text{ cycles/second}$$

This, together with a delay in the information loop of $T_i$=125.100 microseconds, allows each information bit to traverse the information loop and be reinjected into the delay line in the bit interval in front of the succeeding information bit, and with the synchronizing pulse following two bit intervals behind the newest information bit.

Considering the overall circuit operation in greater detail, it will be assumed that the delay line 11 is initially empty and that an input signal V($t$), such as is shown in FIGURE 2, is to be applied to logic network 14. The operation of the circuit is initiated by a start synchronizing pulse from start pulse generator 26, which after being amplified in line driver amplifier 27 is circulated through delay line 11 and amplified by post delay amplifier 13. The amplitude of the synchronizing pulse at the output of post delay amplifier 13 is sufficient to be detected and passed by threshold detector 23. In addition, the synchronizing pulse enters delay cable 22 where it is delayed by two bit intervals. Upon passing through threshold detector 23, the synchronizing pulse triggers the blocking oscillator in pulse generator 12. The blocking oscillator in generator 12 generates a pulse having a width equal to three bit intervals which contributes a three bit interval delay to the synchronizing loop. The leading edge of this pulse is applied through a first output to trigger a second blocking oscillator in gate control generator 25. The gate control generator 25 thereupon generates a pulse having a width equal to four bit intervals, which pulse is applied to the INHIBIT circuit 24 to prevent the output from delay cable 22 from passing through during the time that the inhibiting pulse is applied. Thus, the synchronizing pulse passing through delay cable 22 is prevented from traversing INHIBIT circuit 24. It may be appreciated that the inhibiting pulse is applied long enough to block the bit interval following the synchronizing pulse, so that when the line is filled the oldest information bit is erased.

The pulse generator in pulse generator 12 is also applied to AND gate 17 and is passed or not in response to random input signal V($t$). For the first information sample of the input signal which is a positive component, as seen in the graph of FIGURE 2, the Schmidt trigger 16 applies a first level pulse which enables AND gate 17. It is noted that when sampling a negative portion of the input signal, e.g., the third information sample, a second level pulse is applied to trigger 16 and no signal is permitted to pass through AND gate 17. The leading edge of the pulse at the output of AND gate 17 triggers blocking oscillator 18 which generates a pulse having a width of approximately one bit interval. This pulse traverses OR gate 19 and enables AND gate 20 to pass a positive half sine wave pulse from clock generator 15. The circuit timing provides that optimumly the pulse from OR gate 19 is centered upon a positive half sine wave of clock signal. The half sine wave pulse at the output of AND gate 20, which becomes the first stored information bit, is amplified in the line driver amplifier 21 and admitted to the delay line 11.

The pulse from pulse generator 12 is also connected to differentiating and limiting network 28 which differentiates and passes the trailing edge of the pulse to provide a succeeding synchronizing pulse to line driver amplifier 27. The circuit timing of the three bit interval delay in the synchronizing loop B and the two bit interval delay in the delay cable 22 of the information loop A provides that the amplified synchronizing pulse be admitted to the delay line 11 two bit intervals behind the first information bit so that a blank interval exists between the synchronizing pulse and the first information bit, as shown in graph 1 of FIGURE 4.

The aforementioned blank interval avoids any intersymbol interference between the leading edge of the large synchronizing pulse and the new information bit. Such intersymbol interference must be minimized because of the critical timing function performed by the leading edge of the synchronizing pulse. At this point it is noted that the length of the delay in delay cable 22 determines the number of blank intervals between the synchronizing pulse and the preceding information bit, the number of blank intervals being one less than the number of intervals delay in the delay cable 22. In some applications it may be desirable to make the delay of delay cable 22 three or more bit intervals, in which instance the delay in the synchronizing loop must accordingly be increased so as to always be one bit interval more.

Upon exiting from the delay line 11, the information bit is amplified by post delay amplifier 13. The combined frequency response characteristic of the delay line 11 and post delay amplifier 13 is controlled so that the slope of the attenuation versus frequency response curve is reciprocally related to the slope of the energy frequency spectrum of the individual information bit pulses traversing the delay line in the region of the pass band frequency of the delay line, 20 and 40 megacycles in this embodiment. This allows a considerable portion of the energy of the information bit pulses admitted to the delay line to pass through, while retaining a constant amplitude and width in the output pulses from the delay line, independent of the input code. In this manner pulses of a bit rate appreciably higher than in the prior art, a 20 megacycle bit rate in this instance, may be directly applied to the band-pass delay line. A more detailed explanation of this technique is presented in applicants' copending application entitled "Method and Apparatus for Traversing Digital Information Across Band-Pass Transmission Media," Serial No. 79,403, filed December 29, 1960, and assigned to the assignee of the present invention.

After being amplified by post delay amplifier 13, the first information bit traverses the delay cable 22. It does not pass through threshold detector 23, being of insufficient amplitude. After passing through delay cable 22, the information bit traverses the INHIBIT circuit 24 and in succession enables OR gate 19 and AND gate 20 to pass a one-half sine wave pulse from clock signal generator 15, which replaces the previous pulse as the first information bit. This assures that the bit is properly positioned within the bit interval, and that the recirculating bit pulses retain a constant amplitude and wave form. The first information bit is then amplified by amplifier 21 and admitted into delay line 11.

The above sequence occurs before the INHIBIT circuit 24 becomes blocked by the synchronizing pulse following the first information bit. As described with reference to the preceding synchronizing pulse, this pulse upon being passed by threshold detector 13 triggers pulse generator 12, which in turn triggers gate control generator 25 to provide an inhibiting action to INHIBIT circuit 24. The output from generator 12 enables the AND gate 17, which in turn enables blocking oscillator 18, to admit the second information bit. The second bit is a one-half sine wave pulse which represents the second information sample in the graph of FIGURE 2.

Figure 4:
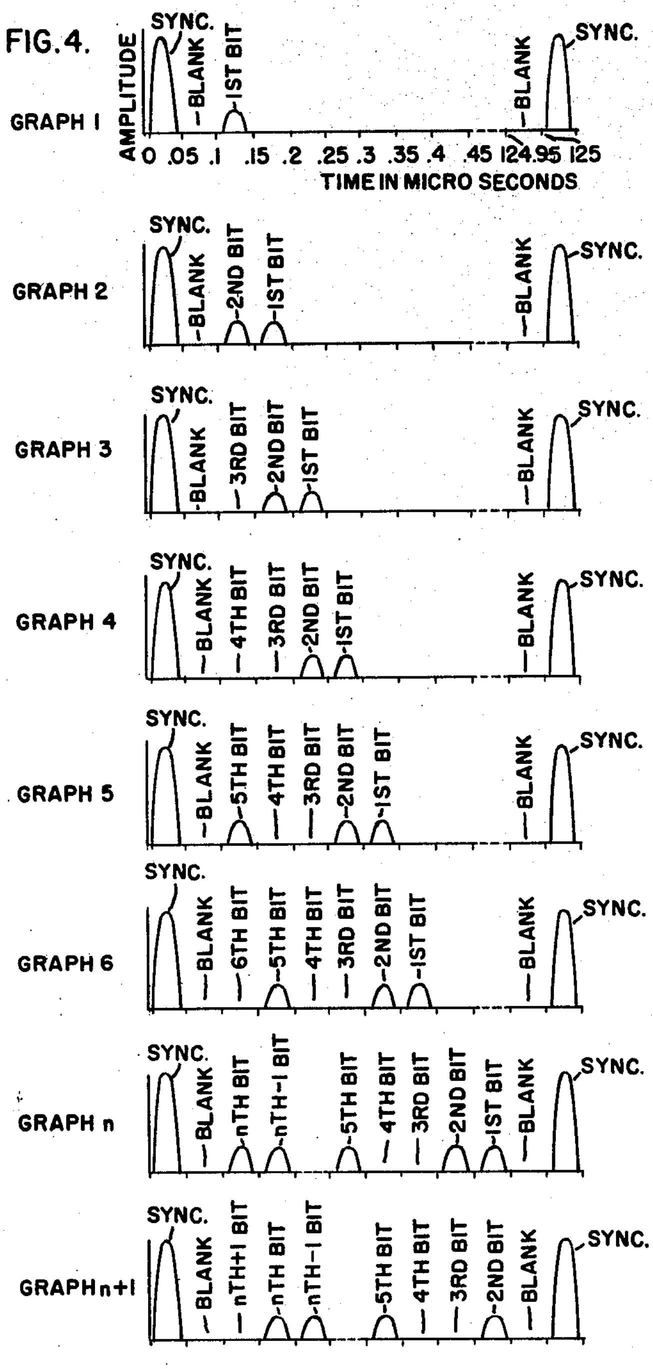
FIGURE 4 is a series of graphs showing the wave form of time compressed signals in the delay line of the circuit of FIGURE 3 at successive stages in the operation.

As illustrated in graph 2 of FIGURE 4, the second information bit replaces the previous blank interval and is admitted to the delay line behind the first information bit, followed by a blank interval and the synchronizing pulse. This operation continues with succeeding information samples being taken until the delay line is completely filled. Graphs 3 to 6 of FIGURE 4 illustrate the succession of signals in the delay line after the third to sixth samples are taken respectively. Graph $n$ illustrates the signal in the delay line when the delay line becomes completely filled, and graph $n+1$ illustrates the signal in the delay after the following sample is taken, wherein the oldest information bit is erased. Thus, in this operation, the most recent information bit is admitted to the delay line following one interval behind the previous information bit and preceding the synchronizing pulse by two bit intervals. The stored information bits shift to the right with respect to the synchronizing pulse during each sampling period, thereby advancing along and filling the delay line. After the delay line is completely filled, additional information bits replace the oldest information bits in the circuit. It may be seen that the maximum number of stored information bits at any one time is three less than the total number of bit intervals because of the synchronizing pulse and the blank intervals.

It is noted that the inhibiting circuit 24, having a four bit wide inhibiting pulse applied thereto, provides a single blank interval following the synchronizing pulse. After the delay line becomes filled, this acts to destroy the oldest information bit. This blank interval is for the purpose of avoiding symbol interference and distortion resulting from dispersion of the synchronizing pulse and an overdriven condition of the amplifier 13 by the synchronizing pulse. In some applications it may be desirable to provide more than a single blank interval which may be accomplished by widening the inhibiting pulse.

Considering deltic correlator circuits once again, it is seen that the present invention also makes possible the employment of a single delay line memory for both the MTS and STS storage functions, thereby completely eliminating the delay line matching requirement in deltic correlators. This may be accomplished by a circuit in which the information bits of the STS and MTS are interleaved and simultaneously circulated through a single delay line. Thus, in addition to the first and second closed paths shown in FIGURE 3, there is provided a third path closed by the long delay line 11 and post delay amplifier 13 in which is circulated the STS. Said third path includes a three bit interval delay cable, a logic network similar to logic network 14, and a line driver amplifier similar to amplifier 21 connected as in the first path. A form of single pole double throw switching means responsive to a timing signal is inserted at the output of amplifier 13 to alternately connect the first and third paths to the junction of the output of the post delay amplifier and the input of the threshold detector. To provide an interleaved storage in the delay line, the delay cable in the first path is adjusted for a one bit interval delay, the second path three bit.

It is recognized that the limited bandwidth of presently employed delay lines discourages this approach because the interleaving necessitates dividing in half the maximum number of bits of each series that may be stored. However, this limitation may be overcome by an improvement in the technique of pulse storage, or possibly by an improved delay line design. One improved technique of pulse storage is disclosed in applicants' previously referred to copending application.

Although the present invention has been described with reference to a specific embodiment, it is not to be construed as limited thereto. Thus, the invention has application to storage circuits employing pulses assuming forms other than that described, e.g., differently shaped pulses or perhaps pulses of R.F. energy. The pulse generator 12, although preferably a blocking oscillator, may alternatively include a multivibrator. In addition, other means may be employed to provide the necessary difference in delay in the two recited closed paths. For example, the synchronizing pulse regenerator 10 may be replaced by an amplifier and a delay cable, allowing the same synchronizing pulse to recirculate. Also, the delay of delay cable 22 may be incorporated elsewhere in the first closed path, as in the INHIBIT circuit 24. In addition, other forms of modulation and detection of the circulated pulses may be employed for discriminating between the synchronizing pulse and the information bits at the output side of the delay line, such as pulse width or pulse phase detection. Alternatively, generator 12 itself may be made responsive to only the synchronizing signals and the detector 23 eliminated as a separate component.

The appended claims are intended to include all modifications that fall within the true spirit of the invention.

What we claim as new and desire to secure by Letters Patent of the United States is:

1. A time compression storage circuit to which is applied an electrical signal to be stored, comprising gating means for sampling said signal at a fixed time interval to obtain sampled information in the form of information bits, a first path closed through a long delay means, means for introducing said information bits into said first path, a second path, also closed through said long delay means, to which is introduced a synchronizing pulse for actuating said gating means, the delay time of the second closed path being equal to said fixed time interval and slightly offset from the delay time of the first closed path, circuit means coupled to the output of said long delay means for selectively coupling said information bits to said first path and for selectively coupling said synchronizing pulse to said second path, whereby said information bits are recirculated through said first closed path once per fixed time interval and are stored in said long delay means in adjacent bit time intervals equal to said offset as a time compressed signal corresponding to the applied signal which is compressed in time by an amount equal to the ratio of said fixed time interval to said offset.

2. A time compression storage circuit as in claim 1 wherein said circuit means includes a time responsive gating means coupled in said first path for passing said information bits into said first path and blocking said synchronizing pulse.

3. A time compression circuit as in claim 2 wherein said information bits have an amplitude of a first level and said synchronizing pulse has an amplitude of a second level, said circuit means including detecting means coupled in said second path for discriminating between said first and second amplitude levels and passing said synchronizing pulse into said second path while rejecting said information bits.

4. A time compression storage circuit as in claim 3 wherein said first path includes a first short delay means coupled between the output of said long delay means and said time responsive gating means, and said second path includes a second short delay means coupled between the output of said detecting means and the input of said long delay means, the delay time of said first short delay means being equal to a plurality of said bit time intervals and the delay time of said second short delay means being different from said plurality by one bit time interval, whereby said synchronizing pulse is recirculated through said long delay means fixedly separated by at least one blank interval from the most recent information bit.

5. A time compression circuit as in claim 4 wherein said long delay means is a fused silica delay line.

6. A time compression storage circuit to which is applied an electrical signal to be stored, comprising gating means for sampling said signal at a fixed time interval to obtain sampled information in the form of information bits, a first path closed through a series connection of a silica delay line and a post delay amplifier, said path including a delay cable, an inhibit circuit and a first line driver amplifier coupled together in the order recited, the input to said delay cable being coupled to the ouput of said post delay amplifier and the output of said first line driver amplifier being connected to the input of said delay line, means for introducing said information bits into said first path, a second path also closed through said silica delay line and said post delay amplifier to which is introduced a synchronizing pulse for actuating said gating means, the amplitude of said synchronizing pulse being several magnitudes greater than the amplitude of said information bits, said second path including a threshold detector, a synchronizing pulse regenerator and a second line driver amplifier coupled together in the order recited, the input to said threshold detector being connected in common with the input of said delay cable to the output of said post delay amplifier and the output of said second line driver amplifier being connected in common with the output of said first line driver amplifier to the input of said delay line, said inhibit circuit acting to pass said information bits into said first path and to block said synchronizing pulse, and said threshold detector acting to pass said synchronizing pulse into said second path while rejecting said information bits, said delay cable having a delay of two bit time intervals and said synchronizing pulse regenerator providing a delay of three bit time intervals, whereby said information bits are recirculated through said first closed path once per fixed time interval and are stored in said delay line in adjacent bit time intervals with the synchronizing pulse following said information bits and separated by one blank interval from the most recent information bit, said information bits forming a time compressed signal corresponding to the applied signal which is compressed in time by an amount equal to the ratio of said fixed time interval to said bit time interval.

References Cited in the file of this patent

UNITED STATES PATENTS 2,601,289 Hollabaugh ------------ June 24, 1952

2,961,535 Lanning -------------- Nov. 22, 1960